United States Patent
Maes et al.

(10) Patent No.: US 7,312,277 B2
(45) Date of Patent: Dec. 25, 2007

(54) MASS POLYMERIZED RUBBER-MODIFIED MONOVINYLIDENE AROMATIC COPOLYMER COMPOSITION

(75) Inventors: Doninique Maes, Lochristi (BE); Adrianus Ruiter, Terneuzen (NL); Gilbert Bouquet, Ghent (BE); Tim Pope, Freeland, MI (US); Rony Vanspeybroeck, Bellem-Aalter (BE); Kees-Jeen Van Duin, Hulst (NL)

(73) Assignee: Dow Global Technologies Inc., Midland, MI (US)

( * ) Notice: Subject to any disclaimer, the term of this patent is extended or adjusted under 35 U.S.C. 154(b) by 219 days.

(21) Appl. No.: 10/563,784

(22) PCT Filed: Apr. 4, 2005

(86) PCT No.: PCT/US2005/011459

§ 371 (c)(1),
(2), (4) Date: Jan. 6, 2006

(87) PCT Pub. No.: WO2005/108447

PCT Pub. Date: Nov. 17, 2005

(65) Prior Publication Data

US 2007/0106028 A1    May 10, 2007

(51) Int. Cl.
*C08F 297/04*    (2006.01)

(52) U.S. Cl. .............. 525/71; 525/53; 525/99; 525/243; 525/314; 525/316; 525/942; 428/36.8; 428/519

(58) Field of Classification Search ................. 525/53, 525/71, 99, 314, 243, 316, 942; 428/36.8, 428/519
See application file for complete search history.

(56) References Cited

U.S. PATENT DOCUMENTS

| | | | |
|---|---|---|---|
| 2,694,692 A | 11/1954 | Amos et al. | |
| 3,243,481 A | 3/1966 | Ruffing et al. | |
| 3,658,946 A | 4/1972 | Bronstert et al. | |
| 4,640,959 A | 2/1987 | Alle | |
| 4,972,024 A * | 11/1990 | Iwamoto et al. ............ | 525/314 |
| 6,380,304 B1 | 4/2002 | Vanspeybroeck et al. | |

FOREIGN PATENT DOCUMENTS

| | | |
|---|---|---|
| DE | 2620853 | 5/1976 |
| EP | 277687 | 1/1988 |
| EP | 400479 | 5/1990 |

* cited by examiner

*Primary Examiner*—Fred Teskin

(57) ABSTRACT

Disclosed is a mass polymerized rubber-modified monovinylidene aromatic copolymer composition with an excellent balance of physical and mechanical properties especially low temperature impact, and methods for preparing such a composition.

22 Claims, No Drawings

MASS POLYMERIZED RUBBER-MODIFIED MONOVINYLIDENE AROMATIC COPOLYMER COMPOSITION

FIELD OF THE INVENTION

This invention relates to a mass polymerized rubber-modified monovinylidene aromatic copolymer composition with an excellent balance of aesthetic, physical and mechanical properties, in particular low temperature toughness, and a method for preparing such a composition.

BACKGROUND OF THE INVENTION

Monovinylidene aromatic copolymers reinforced with rubber, in particular with diene rubber, represent a well known class of commercially available engineering polymers widely described in the literature. Specific examples of the copolymers are for example styrene and acrylonitrile copolymers, generally referred to as SAN resins, containing rubber particles, for example butadiene, dispersed in the polymeric matrix, generally known as ABS resins.

The rubber-modified monovinylidene aromatic copolymers can be prepared by continuous or batch processes and by various polymerization processes such as bulk, mass-solution, or mass-suspension, these are generally known as mass polymerization processes. A continuous mass polymerization process is known and described for example in U.S. Pat. Nos. 2,694,692; 3,243,481 and 3,658,946, and in published EP 400,479. This process consists of dissolving the rubbery material in the monovinylidene aromatic monomer and ethylenically unsaturated nitrile monomer mixture, adding possibly a radical polymerization initiator and an inert diluent, and then polymerizing the resulting solution. Immediately after the polymerization reaction commences, the rubbery material in the monomer mixture separates into two phases, of which the former, consisting of a solution of the rubber in the monomer mixture, initially forms the continuous phase, whereas the latter, consisting of a solution of the resultant copolymer in the monomer mixture, remains dispersed in form of droplets in said continuous phase. As polymerization and hence conversion proceed the quantity of the latter phase increases at the expense of the former. As soon as the volume of the latter phase equals that of the former, a phase change occurs, generally known as phase inversion.

When this phase inversion tales place, droplets of rubber solution form in the polymer solution. These rubber solution droplets incorporate by themselves small droplets of what has now become the continuous polymer phase. During the process, grafting of the polymer chains on the rubber takes place, too.

Generally, the polymerization is carried out in several stages. In the first polymerization stage, known as prepolymerization, the solution of the rubber in the monomer mixture is polymerized until phase inversion is reached. Polymerization is then continued up to the desired conversion.

Mass polymerization affords rubber-modified monovinylidene aromatic copolymers with a good balance of aesthetic and mechanical properties such as toughness. The good aesthetic properties result, in part, because the mass polymerization process does not produce gels and does not require processing aids, such as emulsifiers, which can impart undesirable color. The good mechanical properties such as toughness result, in part, from the amount and morphology of the rubber. The morphology of the rubber is characterized by particle size and particle phase-volume to rubber ratio. There is an optimal particle size range for optimal toughness, if the rubber particles are too small or too large, toughness decreases. Due to the nature of the mass polymerization process, there are many variables, such as reaction mixture viscosity, rubber levels, rubber types, rubber particle sizing mechanisms, grafting kinetics, coupling kinetics, diluent composition, reactor stirring speed, etc., that control the rubber particle size and morphology. These variables are interrelated and can not be varied independently of each other.

Toughness of articles made from rubber-modified monovinylidene aromatic copolymers also depends upon temperature and deformation rate. Articles with adequate toughness at room temperature often demonstrate inadequate toughness at reduced temperatures. For example see U.S. Pat. No. 6,380,304 which discloses a mass polymerized rubber-modified monovinylidene aromatic copolymer composition with an excellent balance of physical and mechanical properties and high intrinsic gloss at ambient temperature, but makes no mention of good low temperature toughness.

There have been numerous attempts to obtain optimal rubber particle size by controlling the viscosity of the diene rubber used in producing rubber-modified monovinylidene aromatic copolymers, see U.S. Pat No. 4,640,959; EP 277,687; and DE 2,620,853. However, these compositions as well have large rubber particle sizes which are undesirable for toughness.

In view of the deficiencies of the rubber-modified monovinylidene aromatic copolymer compositions thus obtained by utilizing any of such methods it would be highly desirable to provide an economical rubber-modified monovinylidene aromatic copolymer composition which exhibits an improved balance of aesthetic, physical and mechanical properties in particularly good low temperature impact resistance.

SUMMARY OF THE INVENTION

Accordingly, the present invention is such a desirable economical rubber-modified monovinylidene aromatic copolymer composition having a desirable balance of aesthetic, physical and mechanical properties in particularly good low temperature impact resistance. The composition comprises (i) a continuous matrix phase comprising a copolymer of a monovinylidene aromatic monomer and an ethylenically unsaturated nitrile monomer and (ii) a rubber component dispersed as discrete rubber particles in the matrix comprising (a) a polybutadiene rubber, preferably a branched polybutadiene rubber comprising three or more arms and (b) a styrene and butadiene block copolymer rubber, preferably a linear styrene and butadiene block copolymer rubber, wherein the rubber component has a polybutadiene content ($PBD_c$) equal to or greater than about 14 weight percent based on the weight of the copolymer composition and the matrix copolymer has a weight average molecular weight ($M_{w\ Matrix}$) represented by the formula: ($M_{w\ Matrix}$)$\geq$510–22*$PBD_c$, preferably ($M_{w\ Matrix}$)$\geq$520–22*$PBD_c$, and most preferably ($M_{w\ Matrix}$)$\geq$530–22*$PBD_c$. The rubber-modified copolymer is prepared using bulk, mass-solution or mass-suspension polymerization techniques. The preferable monovinylidene aromatic monomer is styrene and the preferable ethylenically unsaturated nitrile monomer is acrylonitrile. In one embodiment of the present invention, the block copolymer is a functionalized styrene and butadiene block copolymer which is preferably functionalized with 2,2,6,6,-tetramethyl-1-piperidinyloxy; 2,2,6, 6-tetramethyl-1-[1-[4-(oxiranylmethoxy)phenyl]ethoxy]-piperidine; or 3,3,8,8,10,10-hexamethyl-9-[1-[4-(oxiranylmethoxy)phenyl]ethoxy]-1,5-dioxa-9-azaspiro [5.5]undecane.

In another aspect, the present invention is a process for preparing a mass polymerized rubber-modified monovinylidene aromatic copolymer composition comprising the steps of mass polymerizing in the presence of a dissolved rubber a monovinylidene aromatic monomer and an ethylenically unsaturated nitrile monomer, optionally in the presence of an inert solvent, to the desired degree of conversion and subjecting the resultant mixture to conditions sufficient to remove any unreacted monomers and to cross-link the rubber wherein the rubber component comprises a polybutadiene rubber, preferably a branched polybutadiene rubber of three or more arms, and a block copolymer rubber, preferably a linear styrene and butadiene block copolymer rubber, wherein the rubber component has a polybutadiene content ($PBD_c$) equal to or greater than about 14 weight percent based on the weight of the copolymer composition and the matrix copolymer has a weight average molecular weight ($M_{w\ Matrix}$) represented by the formula: ($M_{w\ Matrix}$) $\geq 510-22*PBD_c$.

In a further aspect, the present invention involves a method of molding or extruding a mass polymerized rubber-modified monovinylidene aromatic copolymer composition comprising the steps of (A) preparing a mass polymerized rubber-modified monovinylidene aromatic copolymer composition comprising (i) a continuous matrix phase comprising a copolymer of a monovinylidene aromatic monomer and an ethylenically unsaturated nitrile monomer and (ii) a rubber component dispersed as discrete rubber particles in the matrix comprising (a) a polybutadiene rubber, preferably a branched polybutadiene rubber of three or more arms, and (b) a block copolymer rubber, preferably a linear styrene and butadiene block copolymer rubber, wherein the rubber component has a polybutadiene content ($PBD_c$) equal to or greater than about 14 weight percent based on the weight of the copolymer composition and the matrix copolymer has a weight average molecular weight (Mw Matrix) represented by the formula: (Mw Matrix)$\geq 510-22*PBD_c$ and (B) molding or extruding said rubber-modified monovinylidene aromatic copolymer composition into a molded or extruded article having. Preferably the extruded article is a sheet or a coextruded sheet.

In yet a further aspect, the invention involves molded or extruded articles of a mass polymerized rubber-modified monovinylidene aromatic copolymer composition comprising (i) a continuous matrix phase comprising a copolymer of a monovinylidene aromatic monomer and an ethylenically unsaturated nitrile monomer and (ii) a rubber component dispersed as discrete rubber particles in the matrix comprising (a) a polybutadiene rubber, preferably a branched polybutadiene rubber of three or more arms, and (b) a block copolymer rubber, preferably a linear styrene and butadiene block copolymer rubber wherein the rubber component has a polybutadiene content ($PBD_c$) equal to or greater than about 14 weight percent based on the weight of the copolymer composition and the matrix copolymer has a weight average molecular weight ($M_{w\ Matrix}$) represented by the formula: ($M_{w\ Matrix}$)$\geq 510-22*PBD_c$.

The mass polymerized rubber-modified monovinylidene aromatic copolymer compositions of the present invention are especially useful in the preparation of molded objects notably parts prepared by injection molding techniques for applications such as household appliances, toys, automotive parts, power tool housings, telephone housings, computer housings, copier housings, electronic enclosures, etc. Moreover, the mass polymerized rubber-modified monovinylidene aromatic copolymer compositions of the present invention are especially useful in the preparation of extruded and thermoformed objects, notably articles prepared by extrusion techniques where good aesthetics and a good balance of physical and mechanical properties, especially low temperature impact are desired. For example, applications such as extruded pipe, extruded profiles, and extruded sheet and/or coextruded sheet for use in large appliance applications, sanitary applications, signage applications, luggage applications, automotive parts, and the like.

DETAILED DESCRIPTION OF THE INVENTION

Suitable rubber-modified monovinylidene aromatic copolymers employed in the present invention comprise a monovinylidene aromatic and ethylenically unsaturated nitrile copolymer in a matrix or continuous phase and rubber particles dispersed in the matrix. The matrix or continuous phase of the present invention is a copolymer comprising polymerized therein a monovinylidene aromatic monomer and an ethylenically unsaturated nitrile monomer or a copolymer comprising polymerized therein a monovinylidene aromatic monomer, an ethylenically unsaturated nitrile monomer and one or more vinyl monomer that can be copolymerized with them. Copolymer, as used herein, is defined as a polymer having two or more monomers interpolymerized. These compositions are generically known as SAN-type or SAN since poly (styrene-acrylonitrile) is the most common example.

The weight average molecular weight ($M_w$) of the matrix copolymer is preferably equal to or greater than about 90, preferably equal to or greater than about 120, and most preferably equal to or greater than about 140. The weight average $M_w$ of the matrix copolymer is preferably equal to or less than about 300, preferably equal to or less than about to 240, more preferably equal to or less than about 200, and most preferably equal to or less than about 175. Matrix molecular weight, unless otherwise specified, is weight average molecular weight, it is measured by gel permeation chromatography (GPC) using narrow molecular weight polystyrene standards, and is given in units of kilogram per mole (kg/mole).

Monovinylidene aromatic monomers include but are not limited to those described in U.S. Pat. Nos. 4,666,987; 4,572,819 and 4,585,825, which are herein incorporated by reference. Preferably, the monomer is of the formula:

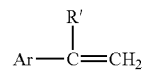

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloallkyl refers to a halo substituted alkyl group. Preferably, Ar is phenyl or alkylphenyl, wherein alkylphenyl refers to an alkyl substituted phenyl group, with phenyl being most preferred. Preferred monovinylidene aromatic monomers include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof.

Typically, such monovinylidene aromatic monomer will constitute from an amount equal to or greater than about 50 weight percent, preferably from an amount equal to or greater than about 60 weight percent, more preferably from an amount equal to or greater than about 65 weight percent, and most preferably from an amount equal to or greater than about 70 weight percent based on the total weight of the matrix copolymer. Typically, such monovinylidene aromatic monomer will constitute less than or equal to about 95 weight percent, preferably less than or equal to about 85 weight percent, more preferably less than or equal to about 80 weight percent, and most preferably less than or equal to about 75 weight percent based on the total weight of the matrix copolymer.

Unsaturated nitriles include, but are not limited to, acrylonitrile, methacrylonitrile, ethacrylonitrile, fumaronitrile and mixtures thereof. The unsaturated nitrile is generally employed in the matrix copolymer in an amount equal to or greater than about 5 weight percent, preferably in an amount equal to or greater than about 10 weight percent, more preferably in an amount equal to or greater than about 15 weight percent, and most preferably in an amount equal to or greater than about 20 weight percent based on the total weight of the matrix copolymer. The unsaturated nitrile is generally employed in the matrix copolymer in an amount less than or equal to about 50 weight percent, preferably equal to or less than about 45 weight percent, more preferably less than or equal to about 35 weight percent, and most preferably less than or equal to about 25 weight percent based on the total weight of the matrix copolymer.

Other vinyl monomers may also be included in polymerized form in the matrix copolymer, including conjugated 1,3 dienes (for example, butadiene, isoprene, etc.); alpha- or beta-unsaturated monobasic acids and derivatives thereof (for example, acrylic acid, methacrylic acid, etc., and the corresponding esters thereof such as methylacrylate, ethylacrylate, n-butyl acrylate, iso-butyl acrylate, methyl methacrylate, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide, etc.; and the like. These additional comonomers can be incorporated in to the composition in several ways including, interpolymerization with the monovinylidene aromatic and ethylenically unsaturated nitrile matrix copolymer and/or polymerization into polymeric components which can be combined, for example, blended in to the matrix. If present, the amount of such comonomers will generally be equal to or less than about 20 weight percent, more preferably equal to or less than about 10 weight percent and most preferably less than or equal to about 5 weight percent based on the total weight of the matrix copolymer.

The matrix copolymer is present in an amount equal to or greater than about 40 weight percent, preferably equal to or greater than about 50 weight percent, more preferably equal to or greater than about 60 weight percent, even more preferably equal to or greater than about 70 weight percent, and most preferably equal to or greater than about 75 weight percent based on the weight of the rubber-modified monovinylidene aromatic copolymer. The matrix copolymer is present in an amount equal to or less than about 86 weight percent, preferably equal to or less than about 83 weight percent, and most preferably equal to or less than about 80 weight percent based on the weight of the rubber-modified monovinylidene aromatic copolymer.

The various techniques suitable for producing rubber-modified monovinylidene aromatic copolymer are well known in the art. Examples of these known polymerization processes include bulk, mass-solution, or mass-suspension polymerization, generally known as mass polymerization processes. For a good discussion of how to make rubber-modified monovinylidene aromatic copolymer see "Modern Styrenic Polymers" of *Series In Polymer Science* (Wiley), Ed. John Scheirs and Duane Priddy, ISBN 0 471 497525. Also, for example, U.S. Pat. Nos. 3,660,535; 3,243,481 and 4,239,863, which are incorporated herein by reference.

In general, continuous mass polymerization techniques are advantageously employed in preparing the rubber-modified monovinylidene aromatic copolymer of the present invention. Preferably, the polymerization is conducted in one or more substantially linear, stratified flow or so-called "plug-flow" type reactor such as described in U.S. Pat. No. 2,727,884, which may or may not comprise recirculation of a portion of the partially polymerized product or, alternatively, in a stirred tank reactor wherein the contents of the reactor are essentially uniform throughout, which stirred tank reactor is generally employed in combination with one or more "plug-flow" type reactors. Alternatively, a parallel reactor set-up, as taught in EP 412801, may also be suitable for preparing the rubber-modified monovinylidene aromatic copolymer of the present invention.

The temperatures at which polymerization is most advantageously conducted are dependent on a variety of factors including the specific initiator and type and concentration of rubber, comonomers and reaction diluent, if any, employed. In general, polymerization temperatures from 60 to 160° C. are employed prior to phase inversion with temperatures from 100 to 190° C. being employed subsequent to phase inversion. Mass polymerization at such elevated temperatures is continued until the desired conversion of monomers to polymer is obtained. Generally, conversion of from 55 to 90, preferably 60 to 85, weight percent of the monomers added to the polymerization system (that is, monomer added in the feed and any additional stream, including any recycle stream) to polymer is desired.

Following conversion of a desired amount of monomer to polymer, the polymerization mixture is then subjected to conditions sufficient to cross-link the rubber and remove any unreacted monomer. Such cross-linking and removal of unreacted monomer, as well as reaction of diluent, if employed, and other volatile materials is advantageously conducted employing conventional devolatilization techniques, such as introducing the polymerization mixture into a devolatilizing chamber, flashing off the monomer and other volatiles at elevated temperatures, for example, from 200° C. to 300° C., under vacuum and removing them from the chamber.

Alternatively, a combination of mass and suspension polymerization techniques are employed. Using said techniques, following phase inversion and subsequent size stabilization of the rubber particles, the partially polymerized product can be suspended with or without additional monomers in an aqueous medium which contains a polymerized initiator and polymerization subsequently completed. The rubber-modified monovinylidene aromatic copolymer is subsequently separated from the aqueous medium by acidification, centrifugation or filtration. The recovered product is then washed with water and dried.

The rubber component of the present invention comprises a polybutadiene rubber and a block copolymer rubber. In addition, the rubber component may comprise various other rubbers including ethylene propylene rubbers, ethylene propylene diene (EPDM) rubbers, acrylate rubbers, polyisoprene rubbers, halogen containing rubbers, interpolymers of rubber-forming monomers with other copolymerizable monomers and mixtures thereof.

The preferred polybutadiene rubber is a homopolymer of 1,3-butadiene. The preferred block copolymer rubber is a block copolymer of 1,3-butadiene, with one or more copolymerizable monomers, such as monovinylidene aromatic monomers as described hereinabove, styrene being preferred. Preferred copolymers of 1,3-butadiene are block or tapered block rubbers of at least about 15 weight percent 1,3-butadiene rubber, preferably 30 weight percent 1,3-butadiene rubber, more preferably from about 50 weight percent, even more preferably from about 70 weight percent, and most preferably from about 90 weight percent 1,3-butadiene rubber and up to about 70 weight percent monovinylidene aromatic monomer, more preferably up to about 50 weight percent, even more preferably up to about 30 weight percent, and most preferably up to about 10 weight percent monovinylidene aromatic monomer, weights based on the weight of the 1,3-butadiene copolymer.

Linear block copolymers can be represented by one of the following general formulas:

S-B;

$S_1$-B-$S_2$;

$B_1$-$S_1$-$B_2$-$S_2$;

In which S, $S_1$, and $S_2$ are non-elastic polymer blocks of a monovinylidene aromatic monomer, with equal or different molecular weights and B, $B_1$, and $B_2$ are elastomeric polymer blocks based on a conjugated diene, with equal or different molecular weights. In these linear block copolymers, the non-elastic polymer blocks have a molecular weight of between 5 kg/mole and 250 kg/mole and the elastomeric polymer blocks have a molecular weight of between 2 kg/mole and 250 kg/mole. Tapered portions can be present among the polymer blocks, S, $S_1$, and $S_2$ and B, $B_1$, and $B_2$. In the tapered portion the passage between the blocks B, $B_1$, and $B_2$ and S, $S_1$, and $S_2$ can be gradual in the sense that the proportion of monovinylidene aromatic monomer in the diene polymer increases progressively in the direction of the non-elastomeric polymer block, whereas the portion of conjugated diene progressively decreases. The molecular weight of the tapered portions is preferably between 5 kg/mole and 30 kg/mole. These linear block copolymers are described for example in U.S. Pat. No. 3,265,765 and can be prepared by methods well known in the art. Unless otherwise stated, rubber molecular weight is weight average molecular weight determined by GPC using narrow molecular weight polystyrene standards and given in kg/mole. Further details on the physical and structural characteristics of these copolymers are given in B. C. Allport et al. "Block Copolymers", Applied Science Publishers Ltd., 1973.

The polybutadiene rubber and/or the block copolymer rubber may comprise at least one functionalized diene rubber. Suitable functionalized diene rubbers include homopolymer of 1,3-butadiene and block copolymer rubbers derived from 1,3-butadiene and a vinyl aromatic monomer. Preferably, the functionalized copolymer is a functionalized block copolymer wherein the block produced from the monovinylidene aromatic monomer is at least 8 weight percent, based on the total weight of the block copolymer. The block copolymers can contain any number of blocks such as SB, SBS, SBSB, SBSBS, SBSBSB and so on. Preferably, the functionalized block copolymer rubber contains at least 8, more preferably at least 10, and most preferably at least 12 to 40, preferably to 35, more preferably to 30 and most preferably to 25 weight percent polymerized vinyl aromatic block, based on the total weight of the block copolymer. It is known that a small amount of tapering can occur in the production of such block rubbers. The functionalized diene rubber may have any architecture, such as linear or star branched, and a microstructure having any vinyl/cis/trans ratio, as long as the functionalized diene rubber meets the other requirements stated previously. Most preferred functionalized diene rubbers are functionalized diblock copolymers of 1,3-butadiene and styrene.

Such rubbers are widely known in the art as well as methods for their manufacture as disclosed in *Science and Technology of Rubber* (Academic Press,) Ed. James E. Mark, Burak Erman, Frederick R. Eirich-Chapter 2. VIII pgs. 60-70.

The functionalized rubber contains a minimum of 1 functional group per rubber molecule. The functional group is defined as a functionality which enables controlled radical polymerization. Controlled radical polymerization employs the principle of dynamic equilibration between growing free radicals and dormant or unreactive species as disclosed in "Controlled/Living Radical Polymerization" (2000) p. 2-7 ACS Symposium series, 768.

The functionality included in the functionalized block copolymer rubber can enable controlled radical polymerization through a number of different mechanisms including by:

I) stable free radical polymerization, for example, nitroxide mediated polymerization or alkyl peroxy diarylborane mediated polymerization;

II) metal catalyzed atom transfer radical polymerization (ATRP);

III) reversible addition-fragmentation chain transfer (RAFT); and

IV) a degenerative transfer process based on a thermodynamically neutral (at the propagation stage) exchange process between a growing radical, and a dormant species; and other degenerative transfer processes as described in "Chapter 1 Overview: Fundamentals of Controlled/Living Radical Polymerization" of *Controlled Radical Polymerization* by Matyjaszewski, 1998 pages 2-30 and *Handbook of Radical Polymerization*, Ed. K. Matyjaszewski, T. P. Davis (Wiley) p 383-384.

The functional group can be attached to the rubber utilizing any acceptable method which places at least one functional group on the backbone or chain end of the diene rubber. In one embodiment, the functional group is attached to the rubber via the end of the polymer chain and no random attachment of the functional group occurs on the rubber polymer chain, for a maximum of 2 functional groups, one on each end. Examples of such are included in U.S. Pat. No. 5,721,320. In a preferred embodiment, the functionalized diene rubber does not contain any other functionalities which are reactive during the radical polymerization process, other than the typical unsaturation present in diene rubbers.

In one embodiment, the functional group will generate a stable free radical which is capable of enabling controlled free radical polymerization. Stable free radicals include compounds which can act as radical polymerization inhibitors such as nitroxide radicals, for example, 2,2,6,6,-tetramethyl-1-piperidinyloxy (TEMPO) as disclosed in U.S. Pat. No. 6,262,179 and U.S. Pat. No. 5,721,320, both of which are incorporated herein by reference. Other suitable compounds that can generate stable free radicals include, but are not limited to 2,2,6,6-tetramethyl-1-[1-[4-(oxiranylmethoxy)phenyl]ethoxy]-piperidine and 3,3,8,8,10,10-hexamethyl-9-[1-[4-(oxiranylmethoxy)phenyl]ethoxy]-1,5-dioxa-9-azaspiro[5.5]undecane.

The stable free radical group is defined as a substituent which is capable of forming a stable free radical upon activation as described in U.S. Pat. No. 5,721,320. Other nitroxy containing compounds can be found in U.S. Pat. No. 4,581,429 by Solomon et al. which is incorporated herein by reference.

The rubbers preferably employed in the practice of the present invention are those polymers and block copolymers which exhibit a second order transition temperature, sometimes referred to as the glass transition temperature ($T_g$), for the diene fragment which is not higher than 0° C. and preferably not higher than −20° C. as determined using conventional techniques, for example, ASTM Test Method D 746-52 T. $T_g$ is the temperature or temperature range at which a polymeric material shows an abrupt change in its physical properties, including, for example, mechanical strength. $T_g$ can be determined by differential scanning calorimetry (DSC).

Preferred structures for the rubber dispersed in the matrix copolymer are one or more branched rubber, one or more hyper-branched rubber, one or more linear rubber or combinations thereof. A most preferred rubber component comprises a branched polybutadiene rubber and a linear block copolymer rubber.

Branched rubbers, as well as methods for their preparation, are known in the art. Representative branched rubbers and methods for their preparation are described in Great Britain Patent No. 1,130,485 and in *Macromolecules*, Vol. II, No. 5, pg. 8, by R. N. Young and C. J. Fetters. A preferred branch rubber is a radial or star-branched polymer, commonly referred to as polymers having designed branching. Star-branched rubbers are conventionally prepared using a polyfunctional coupling agent or a polyfunctional initiator and have three or more polymer segments sometimes referred to as arms, preferably between three to eight arms, bonded to a single polyfunctional element or compound, represented by the formula (rubber polymer segment$)_k$Q wherein preferably, k is an integer from 3 to 8, and Q is a moiety of a polyfunctional coupling agent. Organometalic anionic compounds are preferred polyfunctional initiators, particularly lithium compounds with $C_{1-6}$ alkyl, $C_6$ aryl, or $C_{7-20}$ alkylaryl groups. Tin-based and polyfunctional organic coupling agents are preferably employed; silicon-based polyfunctional coupling agents are most preferably employed.

The arms of the star-branched rubber are preferably one or more 1,3-butadiene rubber, more preferably they are all the same type of 1,3-butadiene rubber, that is, 1,3-butadiene tapered block copolymer(s), 1,3-butadiene block copolymer(s) or 1,3-butadiene homopolymer(s) or a combination thereof. A star-branched rubber with such a structure may be represented by the formula $$X_m Y_n Z_o Q \qquad (1)$$

wherein X is one or more 1,3-butadiene tapered block copolymer, Y is one or more 1,3-butadiene block copolymer and Z is one or more 1,3-butadiene homopolymer, Q is a moiety of a polyfunctional coupling agent and m, n, and o are independently integers from 0 to 8 wherein the sum of m+n+o is equal to the number of groups of the polyfunctional coupling agent and is an integer from at least 3 to 8.

Preferred star-branched rubbers are represented by formula (1) wherein m is equal to zero, for example, $Y_n Z_o Q$. More preferred are star-branched rubbers represented by formula (1) wherein m is equal to zero and n and o are integers equal to or greater than about 1 and less than or equal to about 3 and the sum of n+o is equal to about 4, for example $Y_2 Z_2 Q$, $Y_1 Z_3 Q$, and $Y_3 Z_1 Q$. Even more preferably, all of the arms of the star-branched rubber are the same type of rubber, that is, all 1,3-butadiene tapered block copolymers, for example, $X_m Y_n Z_o Q$ wherein n and o are equal to zero, more preferably all 1,3-butadiene block copolymers for example, $X_m Y_n Z_o Q$ wherein m and o are equal to zero and most preferably all 1,3-butadiene homopolymers, for example, $X_m Y_n Z_o Q$ wherein m and n are equal to zero.

A more preferred star-rubber has about four arms of 1,3-butadiene represented by the formula $X_m Y_n Z_o Q$ wherein Z is one or more 1,3-butadiene homopolymer, Q is a moiety of a tetrafunctional coupling agent, m and n are equal to zero, and o is equal to about 4. Further, a more preferred star-rubber has about four arms of 1,3-butadiene represented by the formula $X_m Y_n Z_o Q$ wherein Y is a 1,3-butadiene and styrene block copolymer, Z is one or more 1,3-butadiene homopolymer, Q is a moiety of a tetrafunctional coupling agent, m is equal to zero, n is equal to about 1, and o is equal to about 3. Moreover, a most preferred star-rubber has about six arms of 1,3-butadiene represented by the formula $X_m Y_n Z_o Q$ wherein Y is one or more 1,3-butadiene and styrene block copolymer, Z is one or more 1,3-butadiene homopolymer, Q is a moiety of a hexafunctional coupling agent, m is equal to zero, the sum of n and o is equal to about 6.

When m and/or n are not equal to zero, styrene and butadiene are the preferred comonomers comprising the tapered block copolymer and/or block copolymer arms of the star-branched rubber. Tapered block copolymer arms and/or block copolymer arms may be attached to the polyfunctional coupling agent through a styrene block. Alternatively, tapered block copolymer arms and/or block copolymer arms may be attached to the polyfunctional coupling agent through a butadiene block.

Methods for preparing star-branched or radial polymers having designed branching are well known in the art. Methods for preparing a polymer of butadiene using a coupling agent are illustrated in U.S. Pat. Nos. 4,183,877; 4,340,690; 4,340,691 and 3,668,162, whereas methods for preparing a polymer of butadiene using a polyfunctional initiator are described in U.S. Pat. Nos. 4,182,818; 4,264,749; 3,668,263 and 3,787,510, all of which are herein incorporated by reference. Other star-branched rubbers useful in the composition of the present invention include those taught in U.S. Pat. Nos. 3,280,084 and 3,281,383, which are incorporated herein by reference.

Linear rubbers, as well as methods for their preparation, are well known in the art. The term "linear rubber" refers to straight chains of polymerized monomer or comonomers which include uncoupled and dicoupled rubber wherein one or two polymeric segments or arms have been attached to a multifunctional coupling agent represented by the formula (rubber polymer segmen$)_k$Q wherein k is an integer from 1 to 2. The rubber polymer segments in a dicoupled linear rubber having the formula (rubber polymer segmen$)_2$Q, can be the same type, that is, both 1,3-butadiene homopolymers, more preferably 1,3-butadiene taper block copolymers, and most preferably 1,3-butadiene block copolymers, or they can be different, for example, one rubber polymer segment can be a 1,3-butadiene homopolymer and the other polymer segment a 1,3-butadiene block copolymer. Preferably, the linear rubber is one or more 1,3-butadiene homopolymer, more preferably one or more 1,3-butadiene tapered block copolymer, most preferably one or more 1,3-butadiene block copolymer or combinations thereof. The preferred comonomers comprising the tapered block copolymer and/or block copolymer linear rubber are styrene and butadiene.

Advantageously the cis content of the polybutadiene rubber and block copolymer rubber will be independently equal to or less than 75 percent, preferably equal to or less than 55 percent, and most preferably equal to or less than 50 percent as determined by conventional IR.

The polybutadiene rubber in the rubber-modified monovinylidene aromatic copolymer of the present invention is present in an amount equal to or greater than about 30 weight percent, preferably equal to or greater than about 40 weight percent, most preferably equal to or greater than about 45 weight percent based on the total weight of the rubber in the rubber-modified monovinylidene aromatic copolymer composition. The polybutadiene rubber of the rubber-modified monovinylidene aromatic copolymer of the present invention is present in an amount equal to or less than about 95 weight percent, preferably equal to or less than about 90 weight percent, more preferably equal to or less than about 80 weight percent, more preferably equal to or less than about 70 weight percent, and most preferably equal to or less than about 60 weight percent based on the total weight of the rubber in the rubber-modified monovinylidene aromatic copolymer composition.

Preferably, the polybutadiene rubber according to the present invention have a relatively low solution viscosities (5 weight percent solution in styrene at 25° C.). Preferably, the polybutadiene rubber has a solution viscosity equal to or greater than about 15 centipoises (cP), preferably equal to or greater than about 20 cP, and most preferably equal to or greater than about 25 cP. The polybutadiene rubber of the present invention has a solution viscosity equal to or less than about 120 cP, preferably equal to or less than about 110 cP and most preferably equal to or less than about 100 cP.

The molecular weight of the polybutadiene rubber is equal to or greater than about 100, preferably equal to or greater than about 150, more preferably equal to or greater than about 200, and most preferably equal to or greater than about 240. The molecular weight of the branched rubber is less than or equal to about 450, preferably less than or equal to about 400, more preferably less than or equal to about 350, and most preferably less than or equal to 320. Unless otherwise stated, rubber molecular weight is weight average molecular weight determined by GPC using narrow molecular weight polystyrene standards and reported in kg/mole.

The block copolymer rubber of the rubber-modified monovinylidene aromatic copolymer of the present invention is present in an amount equal to or less than about 70 weight percent, preferably equal to or less than about 60 weight percent, more preferably equal to or less than about 55 weight percent, and most preferably equal to or less than about 53 weight percent based on the total weight of the rubber in the rubber-modified monovinylidene aromatic copolymer composition. The block copolymer rubber in the rubber-modified monovinylidene aromatic copolymer of the present invention is present in an amount equal to or greater than about 1 weight percent, preferably equal to or greater than about 2 weight percent, more preferably equal to or greater than about 3 weight percent, more preferably equal to or greater than about 4 weight percent, even more preferably equal to or greater than about 5 weight percent and most preferably equal to or greater than about 6 weight percent based on the total weight of the rubber in the rubber-modified monovinylidene aromatic copolymer composition.

The rubber component, which comprises the polybutadiene rubber and the block copolymer rubber, in the rubber-modified monovinylidene aromatic copolymer of the present invention is present in an amount equal to or greater than about 12 weight percent, preferably equal to or greater than about 13 weight percent, more preferably equal to or greater than about 14 weight percent, and most preferably equal to or greater than about 15 weight percent based on the weight of the rubber-modified monovinylidene aromatic copolymer. The rubber component in the rubber-modified monovinylidene aromatic copolymer of the present invention is present in an amount equal to or less than about 60 weight percent, preferably equal to or less than about 40 weight percent, more preferably equal to or less than about 35 weight percent, even more preferably equal to or less than about 30 weight percent, and most preferably equal to or less than about 25 weight percent based on the weight of the rubber-modified monovinylidene aromatic copolymer.

In a preferred embodiment, the rubber component in the rubber-modified monovinylidene aromatic copolymer composition comprises from about 12 weight percent to about 20 weight percent polybutadiene branched rubber, preferably star branched rubber, and from about 1 weight percent to about 8 weight percent of a linear styrene and butadiene block copolymer rubber, weight percents are based on the weight of the rubber-modified monovinylidene aromatic copolymer composition.

The rubber component, with graft and/or occluded polymers if present, is dispersed in the continuous matrix phase as discrete particles. Preferably, the rubber particles comprise a mono-modal distribution, a bimodal distribution, or a multimodal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. The average particle size of the rubber particles is equal to or greater than about 0.1 micrometer (µm), preferably equal to or greater than about 0.2 µm, more preferably equal to or greater than about 0.3 µm, even more preferably equal to or greater than about 0.4 µm, and most preferably equal to or greater than about 0.5 µm. The average particle size of the rubber particles is equal to or less than about 5 µm, preferably equal to or less than about 4 µm, more preferably equal to or less than about 3 µm, even more preferably equal to or less than about 2 µm, and most preferably equal to or less than about 1 µm. The toughness of a rubber-modified monovinylidene aromatic copolymer may decrease when the rubber particle size decreases below 0.5 µm and when the particle size increases above 1.0 µm. Preferably, for the maximum efficiency of the polybutadiene with respect to impact resistance at all temperatures, the rubber-modified monovinylidene aromatic copolymer of the present invention have a rubber particle size between 0.5 µm and 1.0 µm.

The volume average diameter can be determined by the analysis of transmission electron micrographs of the compositions containing the particles, as described in the examples hereinbelow.

Rubber cross-linking is quantified by the light absorbance ratio (LAR). In the rubber-modified copolymer of the present invention, it is preferred that the rubber particles have a light absorbance ratio preferably equal to or greater than about 1, more preferably equal to or greater than about 1.1, even more preferably equal to greater than about 1.4, and most preferably equal to or greater than about 1.7. The preferred light absorbance ratio of the dispersed phase is less than or equal to about 5, preferably less than or equal to about 4, more preferably less than or equal to about 3, even more preferably less than or equal to about 2, and most preferably less than or equal to 1.8. Light absorbance ratio is the ratio of light absorbance for a suspension of the rubber particles in dimethylformamide to the light absorbance for a suspension of the rubber particles in dichloromethane, as described in the examples hereinbelow.

The light absorbance ratio, which is a measure for degree of crosslinking, is dependent on the amount and kind of the polymerization initiator and the temperature and the residence time at the removal step for the volatile components. It also depends on the types and amounts of the matrix monomers, antioxidant, chain transfer agent, etc. A suitable light absorbance ratio can be set by a person skilled in the art by choosing the appropriate conditions for the production process in accordance with the trial and error method.

The polybutadiene content ($PBD_c$) of the rubber component in the rubber-modified monovinylidene aromatic copolymer of the present invention is defined as the total weight of polybutadiene present in the rubber-modified monovinylidene aromatic copolymer composition (for example, from any rubber source, for example branched rubbers, linear rubbers, polybutadiene rubbers, block copolymer rubbers, functionalized rubbers, mixtures thereof, etc.) ($PBD_{wt}$) divided by the total weight of the rubber-modified monovinylidene aromatic copolymer composition ($composition_{wt}$) multiplied by 100:

$$PBD_c = PBD_{wt}/composition_{wt} * 100$$

Preferably, the polybutadiene content is present in an amount equal to or greater than about 14 weight percent, preferably equal to or greater than about 15.5 weight percent, and most preferably equal to or greater than about 17 weight percent based on the weight of the rubber-modified monovinylidene aromatic copolymer composition. Preferably the polybutadiene content in the rubber-modified monovinylidene aromatic copolymer of the present invention is present in an amount equal to or less than about 50 weight percent, preferably equal or less than about 40 weight percent, more preferably equal to or less than about 30 weight percent, even more preferably equal to or less than about 25 weight percent, and most preferably equal to or less than about 20 weight percent based on the weight of the rubber-modified monovinylidene aromatic copolymer composition.

In a preferred embodiment of the present invention, the weight average molecular weight of the matrix copolymer ($M_{w\ Matrix}$) is preferably equal to or greater than 510 minus twenty-two multiplied by the polybutadiene content ($M_{w\ Matrix} \geq 510-22*PBD_c$), more preferably $M_{w\ Matrix} \geq 520-22*PBD_c$, and most preferably $M_{w\ Matrix} \geq 530-22*PBD_c$.

The rubber-modified monovinylidene aromatic copolymer composition of the present invention preferably has a melt flow rate (MFR), determined under conditions of 220° C. and an applied load of 10 kg, equal to or greater than about 0.1, more preferably equal to or greater than about 1, more preferably equal to or greater than about 3, and most preferably equal to or greater than about 5 g/10 min. Generally, the melt flow rate of the rubber-modified copolymer is equal to or less than about 100, preferably equal to or less than about 50, more preferably less than or equal to about 20, and most preferably equal to or less than about 10 g/10 min.

The rubber-modified monovinylidene aromatic copolymer composition of the present invention can be employed in mixtures, alloys or blends with other polymer and/or copolymer resins, for example, mixtures with nylons, polysulfones, polyethers, polyether imides, polyphenylene oxides, polycarbonates or polyesters. In addition, the claimed rubber-modified monovinylidene aromatic copolymer composition may also optionally contain one or more additives that are commonly used in compositions of this type. Preferred additives of this type include, but are not limited to: fillers, reinforcements, ignition resistant additives, stabilizers, colorants, antioxidants, antistats, impact modifiers, silicon oils, flow enhancers, mold releases, nucleating agents, etc. Preferred examples of additives are fillers, such as, but not limited to talc, clay, wollastonite, mica, glass or a mixture thereof Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize mass polymerized rubber-modified monovinylidene aromatic copolymer compositions against degradation caused by, but not limited to heat, light, and oxygen, or a mixture thereof may be used.

If used, such additives may be present in an amount from at least about 0.01 percent by weight, preferably at least about 0.1 percent by weight, more preferably at least about 1 percent by weight, more preferably at least about 2 percent by weight, and most preferably at least about 5 percent by weight based on the weight of the rubber-modified monovinylidene aromatic copolymer composition. Generally, the additive is present in an amount less than or equal to about 25 percent by weight, preferably less than or equal to about 20 percent by weight, more preferably less than or equal to about 15 percent by weight, more preferably less than or equal to about 12 percent by weight, and most preferably less than or equal to about 10 percent by weight based on the weight of the rubber-modified monovinylidene aromatic copolymer composition.

Preferably, a low molecular weight additive having a surface tension of less than 30 dynes/cm (ASTM D1331, 25° C.) is included in the rubber-modified monovinylidene aromatic copolymer. In particular, a low molecular weight silicone oil is used to improve impact properties as described in U.S. Pat. No. 3,703,491, which is herein incorporated by reference. Preferably, the silicone oil is polydimethylsiloxane having a viscosity of from 5 to 1000 cP, preferably from 25 to 500 cP. The composition typically contains the low molecular weight silicone oil from 0.01 to 5.0 weight percent, based on the total weight of the rubber-modified monovinylidene aromatic copolymer, preferably from 0.1 to 2.0 weight percent. The effect of such silicone oil is enhanced by the incorporation of other additives such as wax and tallow, wherein each is also incorporated at a level of from 0.5 to 1.5 weight percent, based on the total weight of the rubber-modified monovinylidene aromatic copolymer. Alternatively, fluorinated compounds such as a perfluoropolyether or a tetrafluoroethylene polymer can be used as the low molecular weight additive. Mixtures of such additives can also be used.

The rubber-modified monovinylidene aromatic copolymer composition of this invention is thermoplastic. When softened or melted by the application of heat, the compositions of this invention can be formed or molded using conventional techniques such as compression molding, injection molding, gas assisted injection molding, calendering, vacuum forming, thermoforming, extrusion and/or blow molding, alone or in combination. The rubber-modified monovinylidene aromatic copolymer composition of the present invention is ideal for forming sheet or coextruded sheet with one or more other polymers. If coextruded, the sheet can have two or more layers, for example there can be 2, 3, 4, 5, etc. layers. Polymers suitable for coextrusion are regrind/recycle of the rubber-modified monovinylidene aromatic copolymer itself, a different rubber-modified monovinylidene aromatic copolymer, thermoplastic elastomer (TPE), thermoplastic polyurethane (TPU), thermoplastic vulcanites (TPV), polyvinylidene fluoride (PVDF), polycarbonate (PC), polycarbonate blends with a rubber-modified monovinylidene aromatic copolymer (for example, PC/ABS), compatabilized polyolefins, thermoplastic polyolefins (TPO), acrylate/butyl acrylate compositions (for example, KORAD™ brand film from Spartech) with poly (methylmethacrylate) (PMMA) and acrylonitrile, styrene, and acrylic acid terpolymer (ASA) being preferred.

The rubber-modified monovinylidene aromatic copolymer composition of the present invention is ideal for formed or molded articles requiring good low temperature impact performance, for instance as tested by notched Charpy impact testing (DIN 534543). Preferably, formed or molded articles comprising the rubber-modified monovinylidene aromatic copolymer composition of the present invention have a notched Charpy impact at −30° C. equal to or greater than 18 kilo Joule per square meter ($kJ/m^2$), more preferably, equal to or greater than 19 $kJ/m^2$, more preferably equal to or greater than 20 $kJ/m^2$, even more preferably equal to or greater than 25 $kJ/m^2$, and most preferably equal to or greater than about 30 $kJ/m^2$.

The mass polymerized rubber-modified monovinylidene aromatic copolymer compositions can also be formed, spun, or drawn into films, fibers, multi-layer laminates or extruded sheets including coated sheet, such as atmospheric plasma coated sheet, or can be compounded with one or more organic or inorganic substances, on any machine suitable for such purpose. Some of the fabricated articles include household appliances, toys, automotive parts, extruded pipe, profiles and sheet for sanitary applications. These compositions can even find use in instrument housings such as for power tools or information technology equipment such as telephones, computers, copiers, etc.

EXAMPLES

To illustrate the practice of this invention, examples of preferred embodiments are set forth below. However, these examples do not in any manner restrict the scope of this invention.

The compositions of examples 1 to 5 are mass produced acrylonitrile butadiene styrene terpolymer resins wherein the rubber was dissolved in a feed stream of styrene, acrylonitrile, optionally n-butylacrylate and ethylbenzene to form a mixture. The mixture was polymerized in continuous process while agitating said mixture. The polymerization occurred in a multi staged reactor system over an increasing temperature profile. During the polymerization process, some of the forming copolymer grafts to the rubber molecules while some of it does not graft, but instead, form the matrix copolymer.

A continuous polymerization apparatus composed of (a) three or (b) four plug flow reactors connected in series, or (c) being (b) combined with a parallel reactor which feeds in between the second and third reactor of the linear setup, wherein each plug flow reactor is divided in three zones of equal size, each zone having a separate temperature control and equipped with an agitator, is continuously charged in zone 1 (and in the first zone of the parallel reactor for setup-(c)) with a feed composed of a rubber component, styrene, acrylonitrile and ethyl benzene, at such a rate that the total residence time in the apparatus is approximately 7 hours. 1,1-di(t-butyl peroxy) cyclohexane is added to the feed line to the first reactor (and parallel reactor for setup-(c), n-dodecylmercaptan (nDM) (chain transfer agent) is added to different zones to optimize the rubber particle sizing and the matrix molecular weight. Table 1 contains further details with respect to feed composition. After passing through the 3 (or 4) reactors, the polymerization mixture is guided to a separation and monomer recovery step using a preheater followed by a devolatilizer. The molten resin is stranded and cut in granular pellets. The monomers and ethyl benzene are recycled and fed to the polymerization apparatus.

Temperature ranges for (a) the three reactors are: reactor 1: (Zone 1, 104-107° C.), (Zone 2, 106-110° C.), and (Zone 3, 108-114° C.); reactor 2: (Zone 4, 110-116° C.), (Zone 5 110-120° C.), and (Zone 6, 110-125° C.); and reactor 3: (Zone 7, 125-140° C.), (Zone 8, 140-155° C.), and (Zone 9, 150-165° C.).

The pellets are used to prepare test specimens on a DEMAG injection molding machine model D 150-452 having the following molding conditions: Barrel temperature settings of 220, 230, and 240° C.; Nozzle temperature of 250° C., Hot runner tip temperature of 245° C., Mold temperature of 50° C.; Injection pressure: 70 bar; Holding pressures 1/2/3: 60/50/35 bar; Back pressure: 5 bar; Injection time: 10 seconds; Follow-up pressure 1/2/3: 5/4/2 seconds; Cooling time: 20 seconds; and Injection speed: 18 cubic centimeters per second ($cm^3/s$).

The formulation content, product characteristics and properties of examples 1 to 5 are given in Table 1 below. Weight percents are based on the weight of the rubber-modified monovinylidene aromatic copolymer composition. In Table 1:

"PB" is an anionically polymerized butadiene rubber with 35 percent cis and coupled with tetrafunctional component to star-branched structure having a 5 percent solution viscosity of 25 cP available as ASAPRENET™ 720 from Asahi;

"SB-1" is an anionically polymerized 30/70 styrene/butadiene diblock copolymer with 38 percent cis and having a 5 percent solution viscosity in styrene of 25 cP available as STEREON™ 730A from Firestone;

"SB-2" is an anionically polymerized 30/70 styrene/butadiene diblock copolymer, with 41 percent cis and having a 5 percent solution viscosity in styrene of 25 cPoise (cP) available as SOLPRENE™ 1322 from Dyanasol LLC;

"SB-3" is a functionalized rubber comprising an anionically polymerized 13/87 styrene/butadiene block copolymer rubber, with 38 percent cis having 13.5 weight percent styrene terminated with 8,8,10,10-Tetramethyl-9-[1-(4-oxyranylmethoxy-phenyl)-ethoxy]-1,5-dioxy-9-aza-spiro[5.5] undecane, having a 5 percent solution viscosity in styrene of 25 cP as described in WO 02/48109.

"$M_{w\ Matrix}$" is the weight average molecular weight for the matrix copolymer measured by gel permeation chromatography using narrow molecular weight polystyrene standards, determinations and a refractive index (RI) detector;

"$M_{n\ Matrix}$" is the number average molecular weight for the matrix copolymer measured by gel permeation chromatography using narrow molecular weight polystyrene standards, determinations were made with a UV RI detector;

"Polydispersity" is the ratio of weight average matrix molecular weight to number average matrix molecular weight: $M_{w\ Matrix}/M_{n\ Matrix}$;

"$RPS_{coulter\ counter}$" is the rubber particle size reported as volume average particle diameters determined by Coulter counter;

"$RPS_{LS230}$" is the rubber particle size reported as volume average particle diameters determined by a Coulter light scattering apparatus;

"$RPS_{Shimadzu}$" is the rubber particle size reported as volume average particle diameters determined by Shimadzu SALD-2001;

"$AN_{ftir}$" is the percentage acrylonitrile in the rubber-modified monovinylidene aromatic copolymer composition which is measured by fourier transformed infra-red spectroscopy;

"$PBD_{ftir}$" is the polybutadiene content in the rubber-modified monovinylidene aromatic copolymer composition which is measured by fourier transformed infra-red spectroscopy and reported in weight percent bases on the weight of the rubber-modified monovinylidene aromatic copolymer composition;

"$STY_{ftir}$" is the styrene content in the rubber-modified monovinylidene aromatic copolymer composition measured by fourier transformed infra-red spectroscopy and reported in weight percent bases on the weight of the rubber-modified monovinylidene aromatic copolymer composition; and "LAR" is the light absorbance ratio determined using a Brinkmann model PC 800 probe calorimeter equipped with a 450 nm wavelength filter, from Brinkmann Instruments Inc., Westbury, New York, or equivalent, is used. In a first vial, a 0.4 gram (g) sample of rubber-modified copolymer is dissolved in 40 milliliters (ml) of diethylformamide (DMF). From the first vial, 5 ml of the resulting DMF solution is added to a second vial containing 40 ml of DMF. From the first vial, 5 ml of the resulting DMF solution is added to a third vial containing 20 ml of dichloromethane (DCM). The probe is zeroed in neat DMF. The absorption of the DMF solution in the second vial and the absorption of the DCM solution in the third vial are determined. The light absorbance ratio is calculated by the following equation:

$$LAR = \frac{(\text{Absorbance of Sample in }DMF)}{(\text{Absorbance of Sample in }DCM)}$$

The following tests are run on Example 1 to 5 and the results of these tests are shown in Table 1:

"Tensile Yield", "Tensile Break Elongation" and "Tensile Modulus" is performed in accordance with ISO 527-2. Tensile Type 1 test specimens are conditioned at 23° C. and 50 percent relative humidity 24 hours prior to testing. Testing is performed at 23° C. using a Zwick 1455 mechanical tester;

"MFR @ 230 and 3.8 kg" melt flow rate is determined according to ISO 1133 on a Zwick 4105 01/03 plastometer at 230° C. and an applied load of 3.8 kg, samples are conditioned at 80° C. for 2 hours before testing;

"MFR @ 220 and 10 kg" melt flow rate is determined according to ISO 1133 on a Zwick 4105 01/03 plastometer at 220° C. and an applied load of 10 kg, samples are conditioned at 80° C. for 2 hours before testing;

"Notched Charpy$_{23°\ C.}$" impact resistance is determined according to DIN 53453 at 23° C.;

"Notched Charpy$_{-30°\ C.}$" impact resistance is determined according to DIN 53453 at -30° C.;

"Notched Izod$_{23°\ C.}$" impact resistance is determined according to ISO 180/4A at 23° C.; and "Intrinsic Gloss" is determined by 60° Gardner gloss on specimens prepared from molded samples, 30 minutes after molding, according to ISO 2813 with "Dr. Lange RB3" reflectometer.

Intrinsic gloss specimens are molded on an Arburg 170 CMD Allrounder injection molding machine, having the following molding conditions: Barrel temperature settings of 210, 215, and 220° C.; Nozzle temperature of 225° C., Mold temperature of 30° C.; Injection pressure: 1500 bar; Holding pressure 50 bar; Holding time 6 seconds; Cavity switch pressure: 200 bar; Cooling time: 30 seconds; and Injection speed: 10 cubic centimeters per second (cm$^3$/s).

The dimensions of the molded plaque are 64.2 mm×30.3 mm×2.6 mm. Intrinsic gloss is measured in the center of the plaque on the surface at which the pressure is measured. The materials are injected through one injected point located in the middle of the short side of the mold. During injection molding, the injection pressure switches to holding pressure when the cavity pressure reaches the pre-set value. The pressure transducer is located at a distance of 19.2 mm from the injection point. By using a constant pre-set cavity pressure value, the weight of the molded plaques is the same for materials with different flow characteristics.

The polishing of the mold is according to SPI-SPE1 standard of the Society of Plastic Engineers.

TABLE 1

|  |  | Example | | | | |
|---|---|---|---|---|---|---|
|  |  | 1 | 2 | 3 | 4 | 5 |
| Reactor Set-up | | a | a | a | c | a |
| FEED COMPOSITION | | | | | | |
| Ethylbenzene | % | 18 | 18 | 18 | 21 | 14 |
| Styrene | % | 53 | 53 | 53 | 50 | 52 |

TABLE 1-continued

| | | Example | | | | |
|---|---|---|---|---|---|---|
| | | 1 | 2 | 3 | 4 | 5 |
| Acrylonitrile | % | 14 | 14 | 14 | 14 | 18 |
| PB | % | 10 | 10 | 10 | 8 | 8 |
| SB-1 | % | 5 | 5 | 5 | | |
| SB-2 | % | | | | 7 | |
| SB-3 | % | | | | | 8 |
| PRODUCT COMPOSITION | | | | | | |
| PB | % | 15 | 16 | 17 | 13 | 11 |
| SB-1 | % | 7 | 8 | 8 | | |
| SB-2 | % | | | | 11 | |
| SB-3 | % | | | | | 11 |
| SB/total rubber | % | 33 | 33 | 33 | 47 | 50 |
| CHARACTERISTICS | | | | | | |
| $M_{w\ Matrix}$ | kg/mole | 150 | 155 | 166 | 153 | 136 |
| Polydispersity | | 2.2 | 2.3 | 2.4 | 2.5 | 32 |
| $RPS_{coulter\ counter}$ | μm | 0.58 | 0.56 | 0.54 | 0.77 | 0.54 |
| $RPS_{LS230}$ | μm | | 0.47 | 0.49 | | |
| $RPS_{Shimadzu}$ | μm | | 0.63 | 0.63 | | |
| $AN_{ftir}$ | % | 18 | 18 | 18 | 18 | 20 |
| $PBD_{ftir}$ | % | 18 | 18 | 18 | 17 | 19 |
| $STY_{ftir}$ | % | 64 | 64 | 64 | 65 | 61 |
| LAR | | | | 1.4 | 2.0 | |
| PHYSICAL PROPERTIES | | | | | | |
| Tensile Yield | MPa | | 32 | 34 | 41 | 40 |
| Tensile Break Elongation | % | | 5 | 9 | 5 | 6 |
| Tensile Modulus | MPa | | 1676 | 1641 | 2040 | 1970 |
| MFR (230° C. and 3.8 kg) | g/10 min. | 1.8 | 1.3 | 1.5 | 1.6 | |
| Notched Charpy 23° C. | kJ/m² | 45 | 43 | 42 | 49 | 44 |
| Notched Charpy −30° C. | kJ/m² | 31 | 33 | 34 | 20 | |
| Notched Izod 23° C. | kJ/m² | 39 | 37 | 44 | 45 | 39 |
| Intrinsic gloss | % | 62 | 62 | 65 | 14 | 66 |

Example 6 is a 4 mm thick solid extruded sheet fabricated from Example 3 rubber-modified monovinylidene aromatic copolymer composition. It is produced on a 70 mm Reifenhauser extruder having a vented screw with a length/diameter (L/D) of 30. The barrel temperatures increase from 180° C. at the first zone to 210° C. at the last zone. The adaptor temperature is about 220° C., the die temperature is about 230° C., the measured melt temperatures is about 235° C. The line is equipped with a MAAG gear pump. The gloss rolls have a down-stack configuration and a diameter of 300 mm and a roll width of 1,200 mm. The temperature of the first roll is set at 80° C., the middle at 85° C. and the bottom roll at 102° C.

Notched Izod testing according to ISO 180/1A is conducted at 23° C. (73° F.), −20° C. (−4° F.) and −40° C. (−40° F.) on samples milled from the 4 mm sheet in the parallel to flow and perpendicular to flow directions. Notched Izod values are given in kJ/m² and the standard deviation based on 6 samples is given in parentheses. Shrinkage is determined on 4 mm extruded sheet according to ISO 15015 after being heated to 170° C. for 20 minutes. Notched Izod and shrink values are reported in Table 2:

TABLE 2

| Flow Direction Notched Izod, kJ/m² | Parallel | Perpendicular |
|---|---|---|
| 23° C. | 47.4 (1.0) | 35.1 (0.9) |
| 0° C. | 42 (0.5) | 35.9 (1.1) |
| −20° C. | 35.1 (0.9) | 32 (0.9) |
| −30° C. | 34.9 (0.5) | 31.2 (1.2) |
| −40° C. | 33.4 (0.4) | 28.7 (0.6) |
| Shrinkage, % | 2 | −4 |

Examples 7 and 8 are solid coextruded sheet fabricated from Example 3 rubber-modified monovinylidene aromatic copolymer composition as a 3.18 mm (0.125 inch) substrate layer beneath a 0.31 mm (0.012 inch) cap layer of PMMA (Example 7) or ASA (Example 8). The PMMA material is SOLARKOTE™ A from Atofina Chemicals, Inc., and the ASA is LURAN™ 797 from BASF Corporation. The substrate layer is extruded with an extruder having a 63.5 mm (2.5 inch) diameter screw with a L/D ratio of 32. The temperatures across the substrate extruder are set at 220° C. in the first zone, 245° C. across the other barrel zones, 240° C. through the screen changer and transfer line, and 235° C. through the die zones, gear/melt pump and static mixer. The cap layer is extruded with an extruder having a 31.75 mm (1.25 in.) diameter screw. The temperature settings across the cap layer extruder are 210° C. in the first zone, 220° in the second zone and 240° C. throughout the rest of the barrels, gear pump and transfer zones. The cap and substrate are combined in a manifold block and extruded through a 355 mm (14 inch) flat die.

Notched Izod testing according to ISO 180/1A is conducted on samples at 23° C., −20° C., and −40° C. on samples cut from the coextruded sheet in the parallel to flow and perpendicular to flow directions. Flexural properties are measured on the samples at 23° C. according to ASTM D790-97 on samples where the cap side was in compression during the test. Flexural strength is reported in pounds per square inch (psi) and flexural modulus is reported in $10^5$ psi. The notched Izod and flexural property results are reported in Table 3:

TABLE 3

| Notched Izod, kJ/m² | Example 7 | | Example 8 | |
|---|---|---|---|---|
| | Parallel | Perpendicular | Parallel | Perpendicular |
| 23° C. | 34.3 | 28.7 | 52.5 | 41 |
| −20° C. | 8.4 | 6.4 | 15.4 | 31.8 |
| −40° C. | 4.8 | 3.8 | 4.7 | 3.7 |
| Flexural Properties, 23° C. | | | | |
| Strength, psi | | 3.0 | | 8950 |
| Modulus, $10^5$ psi | | 3.1 | | 8830 |

The invention claimed is:

1. A mass polymerized rubber-modified monovinylidene aromatic copolymer composition comprising:
   (i) a continuous matrix phase comprising a copolymer of a monovinylidene aromatic monomer and an ethylenically unsaturated nitrile monomer and (ii) a rubber component dispersed as discrete rubber particles in the matrix comprising
      (a) a polybutadiene rubber with a 5 weight percent solution viscosity in styrene at 25° C. of between 15 to 120 cP and
      (b) a styrene and butadiene block copolymer rubber
   wherein the rubber component has a polybutadiene content ($PBD_c$) equal to or greater than about 14 weight percent based on the weight of the copolymer composition and the matrix copolymer has a weight average molecular weight (Mw Matrix) represented by the formula:

(Mw Matrix)$\geq$510−22*$PBD_c$.

2. The mass polymerized rubber-modified monovinylidene aromatic copolymer composition of claim 1 wherein the ethylenically unsaturated nitrile is from about 10 to about 35 weight percent of the copolymer.

3. The mass polymerized rubber-modified monovinylidene aromatic copolymer composition of claim 1 wherein the monovinylidene aromatic monomer is styrene and the ethylenically unsaturated nitrile monomer is acrylonitrile.

4. The mass polymerized rubber-modified monovinylidene aromatic copolymer composition of claim 1 further comprising a comonomer selected from the group consisting of n-butyl acrylate and N-phenyl maleimide.

5. The mass polymerized rubber-modified monovinylidene aromatic copolymer composition of claim 1 wherein:
   (i) the copolymer is present in an amount from about 40 to 86 weight percent and
   (ii) the rubber component is present in an amount from about 60 to 14 weight percent,
wherein weight percents are based on the total weight of the rubber-modified monovinylidene aromatic copolymer.

6. The mass polymerized rubber-modified monovinylidene aromatic copolymer composition of claim 1 wherein
   (a) the polybutadiene rubber comprises a linear rubber, a branched rubber, a hyper-branched rubber, or mixture thereof and
   (b) the styrene and butadiene block copolymer rubber comprises a linear rubber, a branched rubber, a hyper-branched rubber, or mixture thereof.

7. The mass polymerized rubber-modified monovinylidene aromatic copolymer composition of claim 1 wherein
   (a) the polybutadiene rubber is a branched rubber of three or more arms and
   (b) the styrene and butadiene block copolymer rubber is a linear rubber.

8. The mass polymerized rubber-modified monovinylidene aromatic copolymer composition of claim 1 wherein the rubber component comprises a functionalized styrene and butadiene block copolymer rubber.

9. The mass polymerized rubber-modified monovinylidene aromatic copolymer composition of claim 6 wherein the block copolymer is functionalized with 2,2,6, 6,-tetramethyl-1-piperidinyloxy; 2,2,6,6-tetramethyl-1-[1-[4-(oxiranylmethoxy) phenyl]ethoxy]-piperidine; or 3,3,8,8, 10,10-hexamethyl-9-[1-(4-oxiranylmethoxyphenyl)-ethoxy]-1,5-dioxa-9-azaspiro [5.5]undecane.

10. The mass polymerized rubber-modified monovinylidene aromatic copolymer composition of claim 1 wherein the rubber particles have an average particle size from about 0.5 to about 1 micrometers.

11. The mass polymerized rubber-modified monovinylidene aromatic copolymer composition of claim 1 having a light absorbance ratio from about 1 to about 3.

12. A mass polymerized rubber-modified monovinylidene aromatic copolymer composition having a notched Charpy impact strength equal to or greater than 18 kJ/m² at a temperature of −30° C.

13. A method for preparing a mass polymerized rubber-modified monovinylidene aromatic copolymer composition comprising the steps of:
   (i) polymerizing by bulk, mass-solution or mass-suspension polymerization techniques in the presence of a dissolved rubber component a monovinylidene aromatic monomer and an ethylenically unsaturated nitrile monomer, optionally in the presence of an inert solvent, to the desired degree of conversion and
   (ii) subjecting the resultant mixture to conditions sufficient to remove any unreacted monomers and to crosslink the rubber,
   wherein the polymerized monovinylidene aromatic monomer and the ethylenically unsaturated nitrile monomer comprise a matrix copolymer and
   wherein the rubber component
      (a) comprises a polybutadiene rubber with a 5 weight percent solution viscosity in styrene at 25° C. of between 15 to 120 cP and a styrene and butadiene block copolymer rubber and
      (b) has a polybutadiene content ($PBD_c$) equal to or greater than about 14 weight percent based on the weight of the copolymer composition
   and the matrix copolymer has a weight average molecular weight (Mw Matrix) represented by the formula: (Mw Matrix)$\geq$510−22*$PBD_c$.

14. The method of claim 13 wherein the monovinylidene aromatic monomer is styrene and the ethylenically unsaturated nitrile monomer is acrylonitrile.

15. The method of claim 13 wherein the polybutadiene rubber is a branched rubber of three or more arms and the styrene and butadiene block copolymer a linear rubber.

16. The method of claim 13 wherein the styrene and butadiene block copolymer is functionalized with 2,2,6,6,-tetramethyl-1-piperidinyloxy; 2,2,6,6-tetramethyl-1-[1-[4-(oxiranylmethoxy)phenyl]ethoxy]-piperidine; or 3,3,8,8,10,10-hexamethyl-9-[1-[4-(oxiranylmethoxy)phenyl]ethoxy]-1,5-dioxa-9-azaspiro[5.5]undecane.

17. A method for producing a molded or extruded article of a mass polymerized rubber-modified monovinylidene aromatic copolymer composition comprising the steps of:
(A) preparing a mass polymerized rubber-modified monovinylidene aromatic copolymer composition comprising
  (i) a continuous matrix phase comprising a copolymer of a monovinylidene aromatic monomer and an ethylenically unsaturated nitrile monomer and
  (ii) a rubber component dispersed as discrete rubber particles in the matrix comprising
    (a) a polybutadiene rubber with a 5 weight percent solution viscosity in styrene at 25° C. of between 15 to 120 cP and
    (b) a styrene and butadiene block copolymer
  wherein the rubber component has a polybutadiene content ($PBD_c$) equal to or greater than about 14 weight percent based on the weight of the copolymer composition and the matrix copolymer has a weight average molecular weight (Mw Matrix) represented by the formula:

$$(\text{Mw Matrix}) \geq 510 - 22 * PBD_c,$$

and
(B) molding or extruding said rubber-modified monovinylidene aromatic copolymer composition into a molded or extruded article.

18. The method of claim 17 wherein the molded or extruded article is a sheet or coextruded sheet with another polymer.

19. The method of claim 18 wherein the other polymer is PMMA or ASA.

20. The method of claim 17 wherein the molded or extruded article is a household appliance, a toy, an automotive part, an extruded pipe, an extruded profile, a sheet, a sanitary application, a power tool housing, a telephone housing, a computer housing, signage, luggage, or copier housing.

21. The composition of claim 1 in the form of a molded or extruded article.

22. The molded or extruded article of claim 21 is a household appliance, a toy, an automotive part, an extruded pipe, an extruded profile, a sheet, a sanitary application, a power tool housing, a telephone housing, a computer housing or a copier housing.

* * * * *